US008573921B2

(12) United States Patent
Waisanen

(10) Patent No.: US 8,573,921 B2
(45) Date of Patent: Nov. 5, 2013

(54) METHOD AND A DEVICE FOR LIFTING AND ROTATING A MASSIVE CONTAINER

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 553 days.

(21) Appl. No.: 12/471,540

(22) Filed: May 26, 2009

(65) Prior Publication Data

US 2009/0232634 A1 Sep. 17, 2009

Related U.S. Application Data

(62) Division of application No. 11/252,070, filed on Oct. 17, 2005, now Pat. No. 7,547,177.

(51) Int. Cl.
*B60P 1/00* (2006.01)

(52) U.S. Cl.
USPC .......................................................... 414/812

(58) Field of Classification Search
USPC ......... 414/419, 421, 459, 460, 784, 783, 771, 414/764, 758, 754, 743, 642, 639, 451, 448, 414/450, 425, 346, 453, 455, 456, 809, 812, 414/816, 919, 458, 620
See application file for complete search history.

(56) References Cited

U.S. PATENT DOCUMENTS

| | | | | |
|---|---|---|---|---|
| 2,645,372 | A * | 7/1953 | Broersma | 414/620 |
| 2,775,357 | A | 12/1956 | Arment | |
| 2,844,264 | A | 7/1958 | Stim et al. | |
| 2,968,410 | A * | 1/1961 | Hamilton et al. | 414/783 |
| 2,968,411 | A * | 1/1961 | Jegge | 414/422 |
| 3,126,107 | A * | 3/1964 | Waddy | 414/639 |
| 3,306,479 | A * | 2/1967 | Hopfeld | 414/414 |
| 3,494,492 | A | 2/1970 | Thiermann | |
| 3,583,586 | A * | 6/1971 | Burton | 414/620 |
| 3,765,549 | A * | 10/1973 | Jones | 414/290 |
| 3,897,881 | A | 8/1975 | Brock | |
| 3,917,093 | A | 11/1975 | Greaves | |
| 4,020,960 | A | 5/1977 | Louis et al. | |
| 4,053,062 | A * | 10/1977 | Travis | 29/726.5 |
| 4,080,905 | A * | 3/1978 | Cook | 410/45 |
| 4,084,706 | A * | 4/1978 | Russell | 414/460 |
| 4,105,130 | A | 8/1978 | Hardwick et al. | |
| 4,116,337 | A * | 9/1978 | Backus | 206/591 |
| 4,213,727 | A * | 7/1980 | Lighthipe, Jr. | 414/420 |
| 4,381,839 | A | 5/1983 | Engler et al. | |
| 4,433,952 | A | 2/1984 | Glickman | |
| 4,551,059 | A | 11/1985 | Petoia | |
| 4,615,656 | A * | 10/1986 | Geraghty, Jr. | 414/607 |
| 4,666,659 | A * | 5/1987 | Lusk et al. | 376/272 |
| 4,683,969 | A | 8/1987 | Littau | |
| 4,729,710 | A | 3/1988 | Kress et al. | |
| 4,951,990 | A * | 8/1990 | Hollan et al. | 294/119.1 |

(Continued)

*Primary Examiner* — Saul Rodriguez
*Assistant Examiner* — Glenn Myers
(74) *Attorney, Agent, or Firm* — Porter, Wright, Morris & Arthur, LLP

(57) ABSTRACT

A device and method for lifting and rotating a massive container comprising a base frame assembly, a cradle pivotally connected to the base frame assembly and adapted to hold the container, a mechanism for moving the container vertically relative to at least part of the base frame assembly, and a hydraulic cylinder connected between the base frame assembly and the cradle for rotating in a vertical plane the cradle relative to the base frame assembly.

24 Claims, 10 Drawing Sheets

(56) References Cited

U.S. PATENT DOCUMENTS

| | | | | | |
|---|---|---|---|---|---|
| 5,009,565 | A | * | 4/1991 | Esau | 414/607 |
| 5,291,984 | A | * | 3/1994 | Lusetti | 198/408 |
| 5,302,073 | A | | 4/1994 | Riemersma et al. | |
| 5,379,814 | A | * | 1/1995 | Posly | 141/351 |
| 5,391,039 | A | * | 2/1995 | Holtom | 414/408 |
| 5,448,604 | A | * | 9/1995 | Peterson, II | 376/261 |
| 5,743,703 | A | * | 4/1998 | Nakajima | 414/590 |
| 5,839,874 | A | | 11/1998 | Johnston | |
| 5,888,043 | A | * | 3/1999 | Jatcko | 414/459 |
| 6,017,181 | A | | 1/2000 | Johnston | |
| 6,328,524 | B1 | | 12/2001 | Johnston | |
| 6,371,717 | B1 | * | 4/2002 | Grams et al. | 414/416.09 |
| 6,883,641 | B2 | * | 4/2005 | Julien | 182/69.1 |

* cited by examiner

METHOD AND A DEVICE FOR LIFTING AND ROTATING A MASSIVE CONTAINER

CROSS REFERENCE TO RELATED APPLICATIONS

This is a divisional application of U.S. patent application Ser. No. 11/252,070 filed on Oct. 17, 2005, now U.S. Pat. No. 7,547,177 the disclosure of which is expressly incorporated herein in its entirety by reference.

BACKGROUND OF THE INVENTION

The present invention relates to a method and a device for lifting and rotating a massive container, such as used for engaging, lifting and safely transporting casks containing nuclear waste material.

BRIEF SUMMARY OF THE INVENTION

It is an object of the invention to provide a new and improved apparatus and method for lifting heavy objects.

It is still a further object of the invention to provide a device capable of moving a massive container with a lower profile than possible in the prior art. This would permit easier movement of the container from one storage area to another, as well as reduce its overall center of gravity.

It is a further object of this invention to provide a more compact lifting device than found in the prior art.

Accordingly, this invention provides a device and method for lifting and rotating a massive container comprising a base frame assembly, a cradle pivotally connected to the base frame assembly and adapted to hold the container, a mechanism for moving the container vertically relative to at least part of the base frame assembly, and a hydraulic cylinder connected between the base frame assembly and the cradle for rotating in a vertical plane the cradle relative to the base frame assembly.

This invention also provides a method of moving a massive container comprising the steps of connecting a cradle to the container, then lifting the container vertically, and then pivoting the cradle to rotate about ninety degrees the container in a vertical plane.

Other features and advantages of the invention will become apparent to those skilled in the art upon review of the following detailed description, claims and drawings in which like numerals are used to designate like features.

Figure 1:
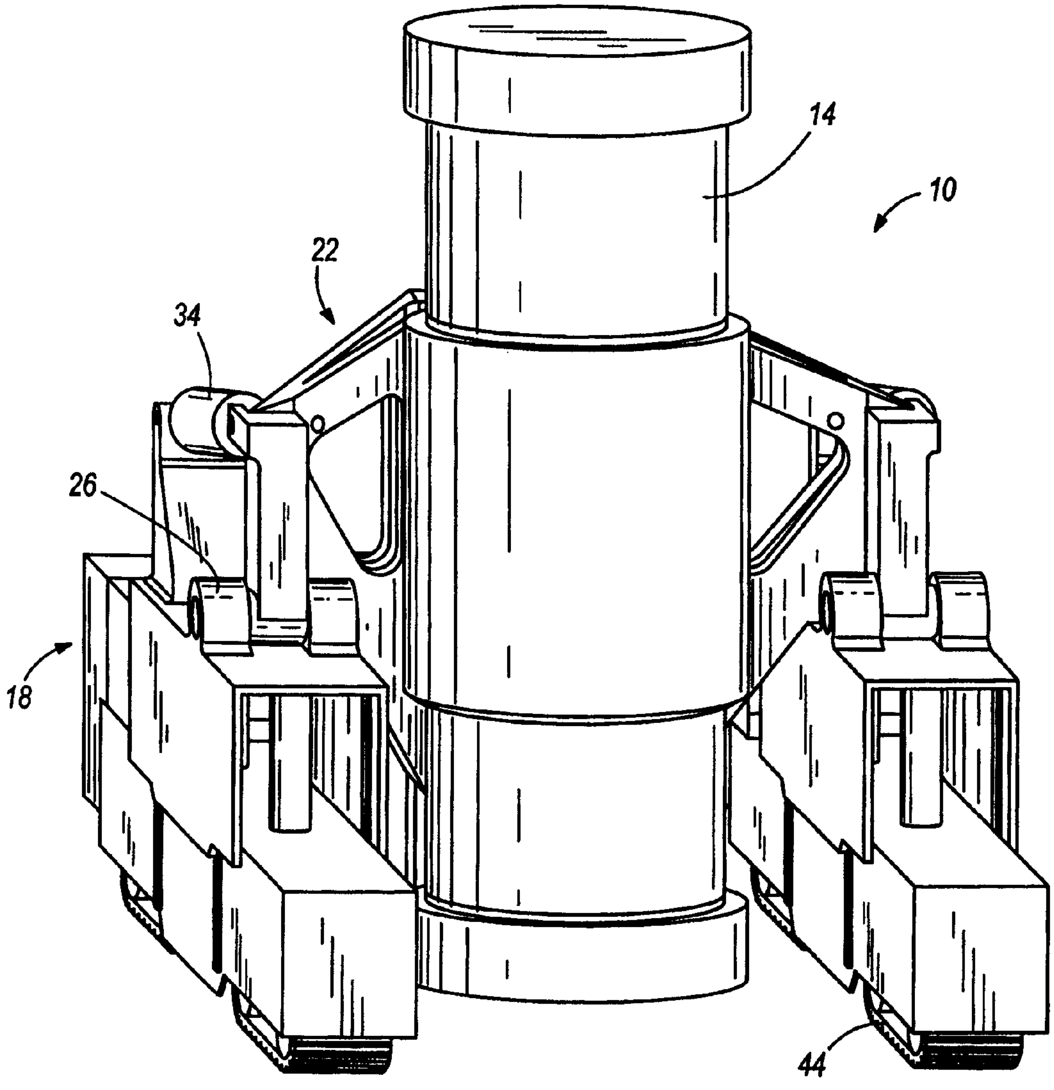
FIG. 1 is a perspective view of the device of this invention holding a container such as a nuclear waste storage cask.

Before the embodiments of the invention are explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use of "including" and "comprising" and variations thereof herein is meant to encompass the items listed thereafter and equivalents thereof as well as additional items and equivalents thereof. The use of "consisting of" and variations thereof herein is meant to encompass only the items listed thereafter and the equivalents thereof.

DETAILED DESCRIPTION OF THE PREFERRED EMBODIMENTS

Figure 2:
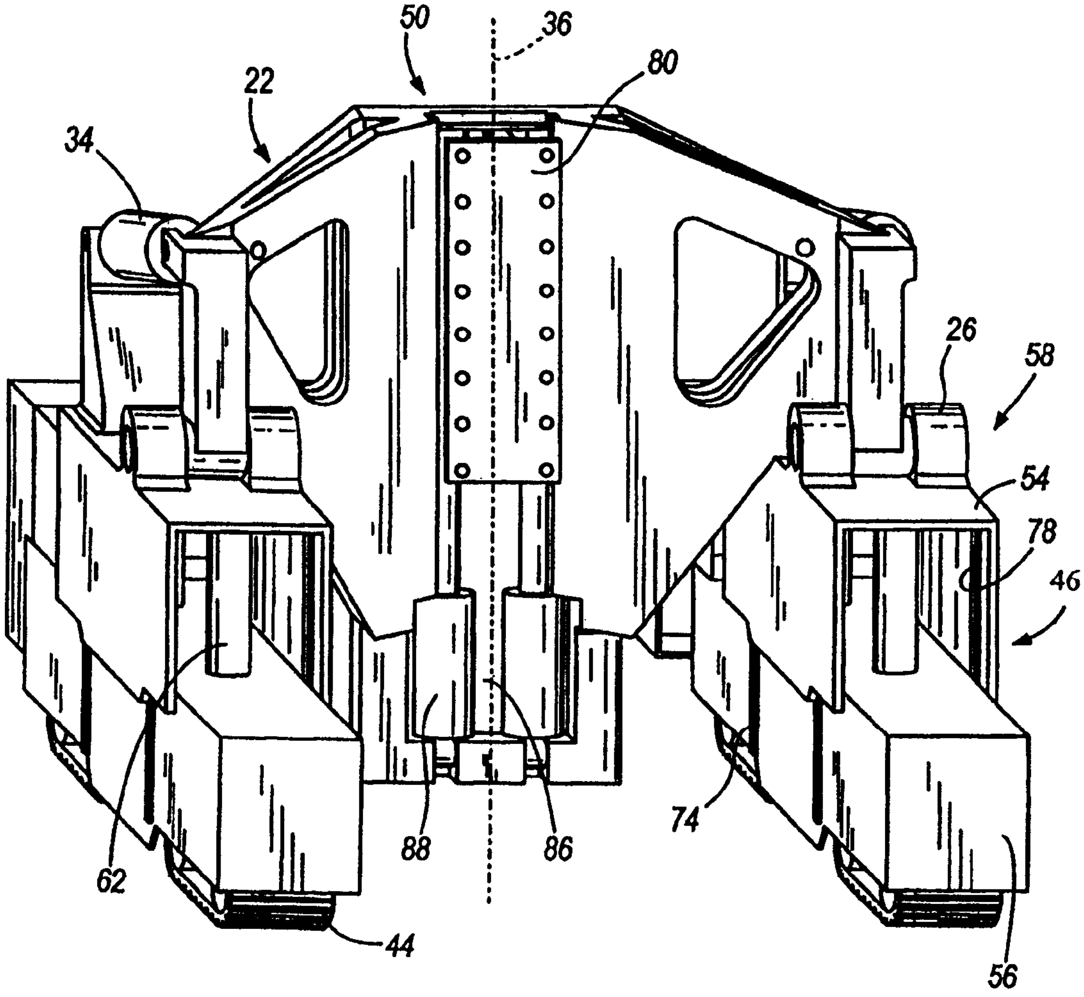
FIG. 2 is an end view of the device of FIG. 1 without the cask and with the cask cradle in a vertical position.

As illustrated in FIGS. 1 and 2, this invention provides a device 10 for lifting and rotating a massive container 14, such as a spent nuclear fuel rod storage cask weighing 318 tons and thirty-feet high. The device 10 is a self-propelled vehicle that lifts, transports and positions such radioactive waste storage casks. The device 10 can be used, as shown in FIGS. 3 and 4, to remove the storage cask 14 from a rail car 15.

The device 10 comprises a base frame assembly 18, a cradle 22 adapted to hold the container 14, and means 26 for connecting the cradle 22 to the base frame assembly 18. The device 10 further includes container moving means (as explained below) for moving the container 14 vertically relative to the base frame assembly 18, and means 34 connected between the base frame assembly 18 and the cradle 22 for rotating the cradle 22 in a vertical plane 36 relative to the base frame assembly 18.

Cradle 22 as used herein is a framework for supporting the container 14, and the cradle can be located below, beside or above the container 14, as further described below. The cradle 22 supports the container 14 and has a cradle centerline 38 (FIG. 4) that extends generally along the longitudinal axis of the container 14.

Figure 3:
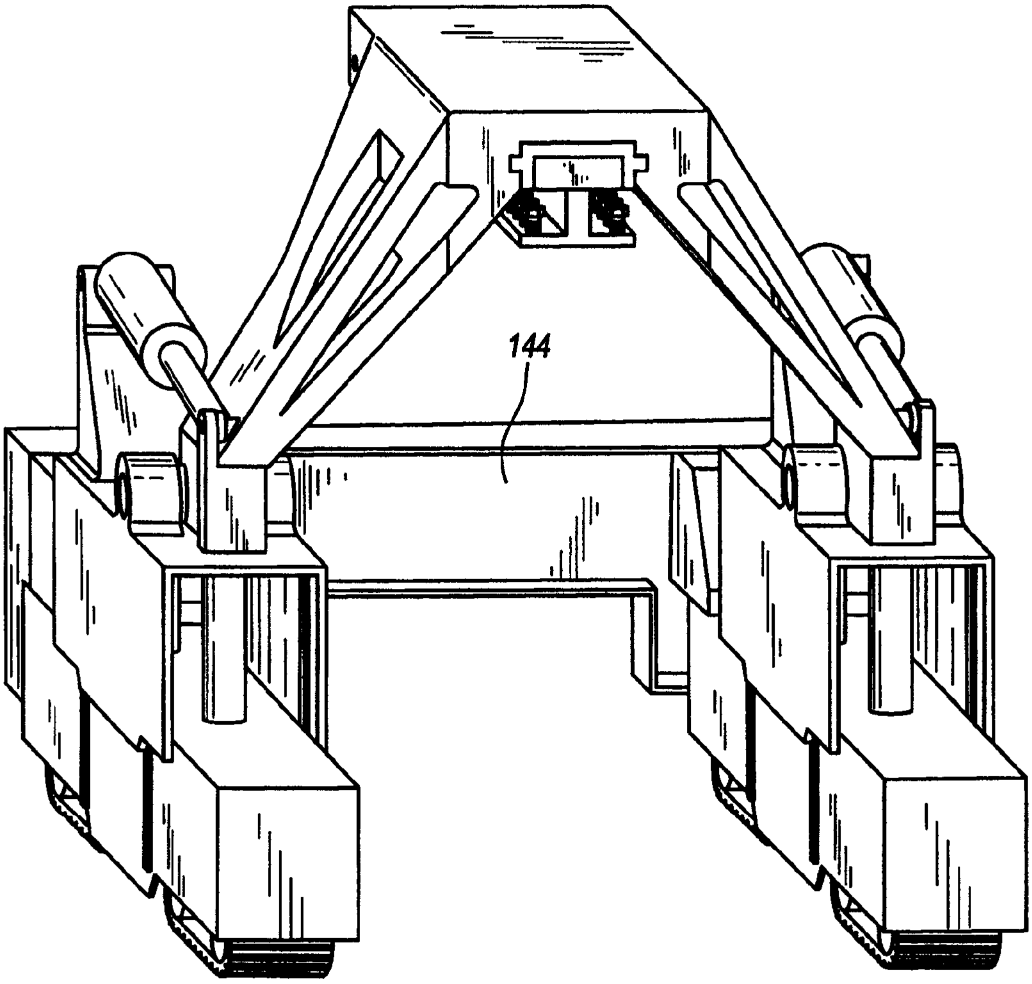
FIG. 3 is another end view of the device of FIG. 1 without the cask and with the cask cradle in a raised horizontal position.
Figure 4:
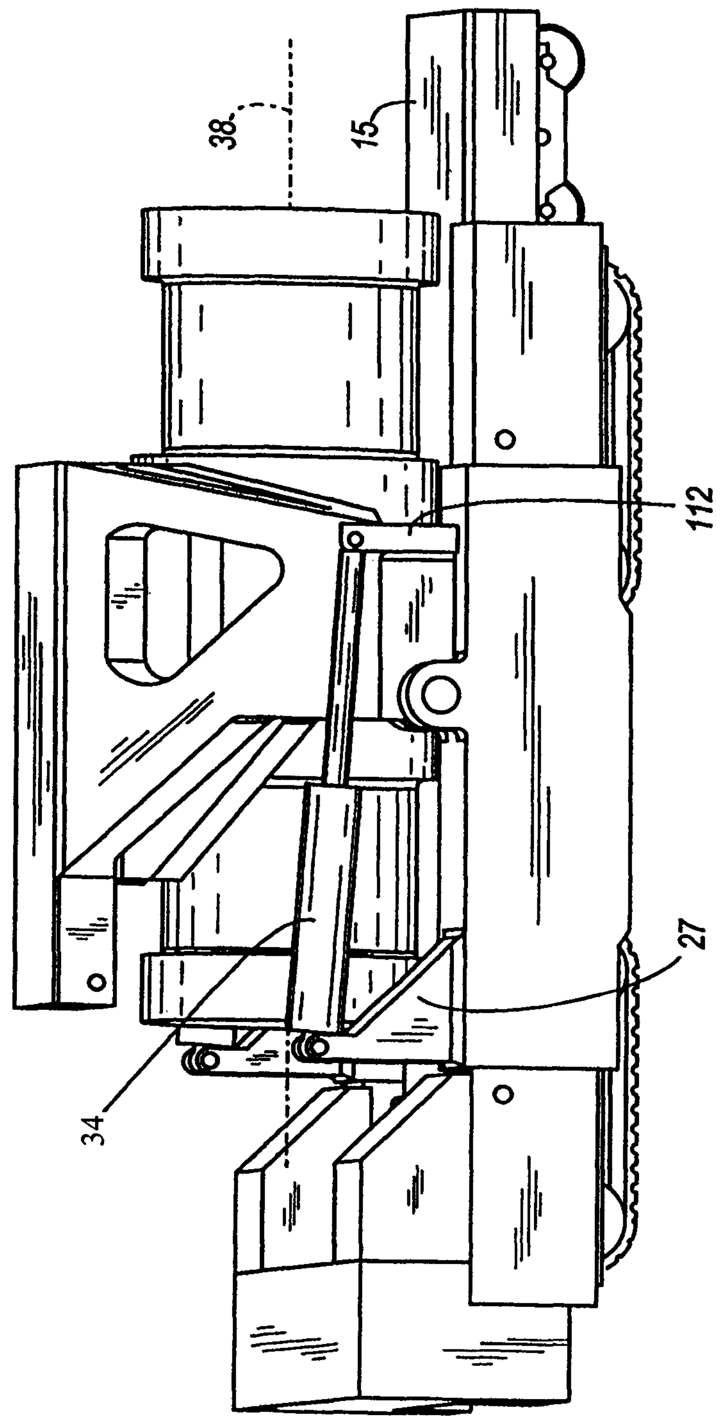
FIG. 4 is a side view of the device of FIG. 1 with a cask on a railroad car.
Figure 11:
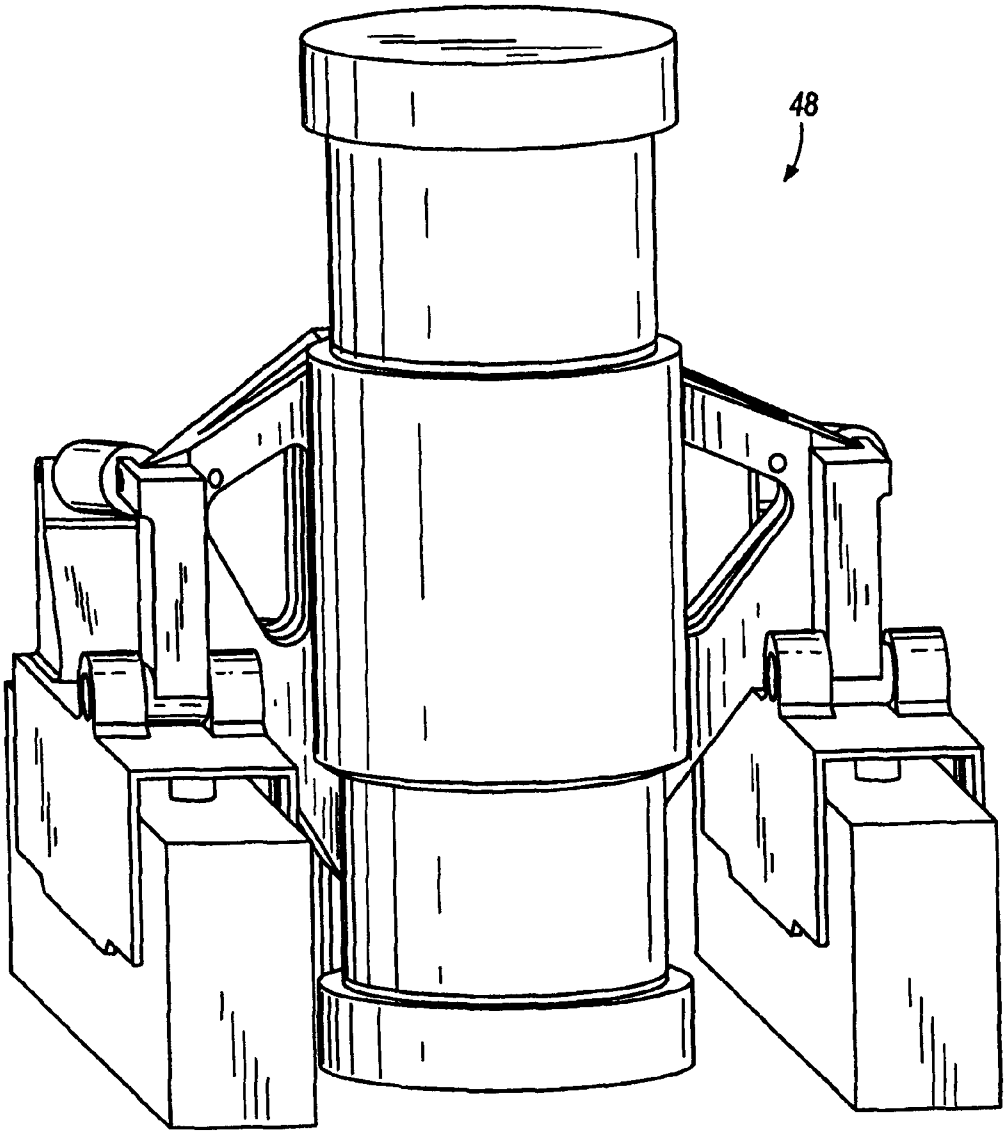
FIG. 11 is a perspective view of another embodiment of the device of this invention without a mechanism for moving the device.

As shown in FIGS. 1, 2 and 3, the device 10 further includes self-propelled means for moving the device 10 from one location to another location. In other embodiments, where mobility is not required, such as in the device 48 shown in FIG. 11, the self-propelled means can be omitted and the base frame assembly can sit on the ground or some other support (not shown).

More particularly, the self-propelled means is in the form of two substantially parallel sets of two back to back, spaced apart conventional tread mechanisms 44, one set mounted on each side of the base frame assembly 18. Individual remotely controlled motors (not shown) are supported on the base frame assembly 18 and drive each respective tread mechanism 44 to maneuver and propel the device 10.

Figure 12:
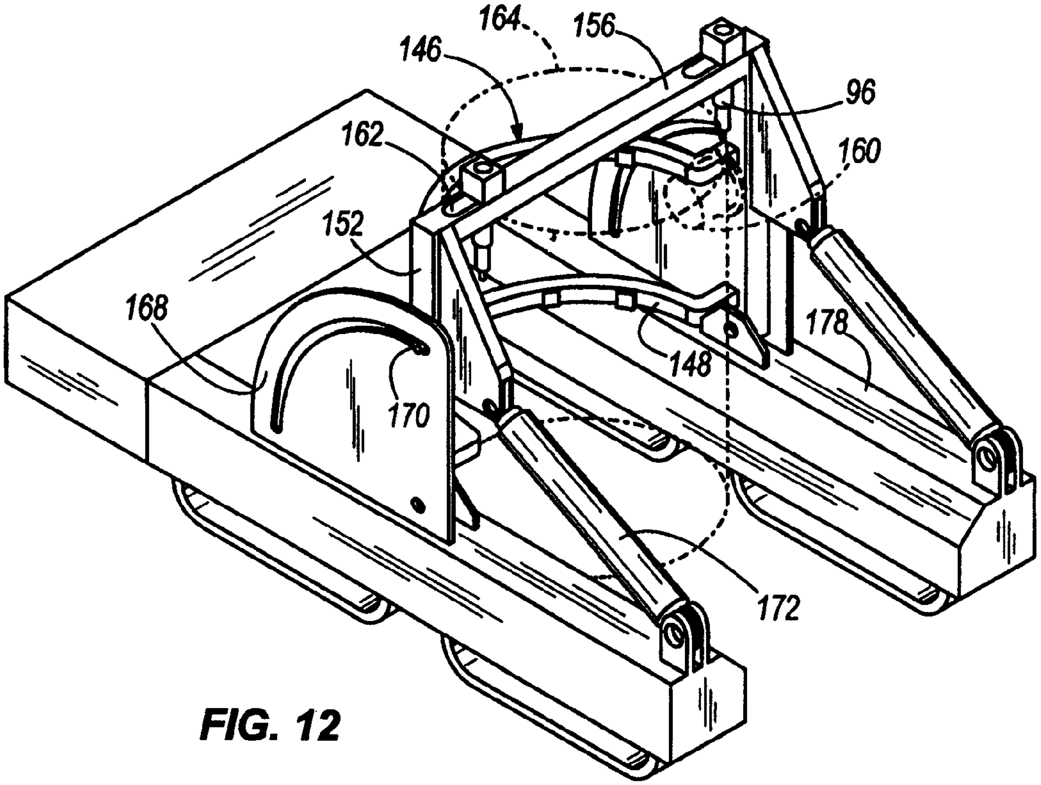
FIG. 12 is a perspective view of yet another embodiment of the device of this invention with the cask shown in ghost and in a vertical position.
Figure 13:
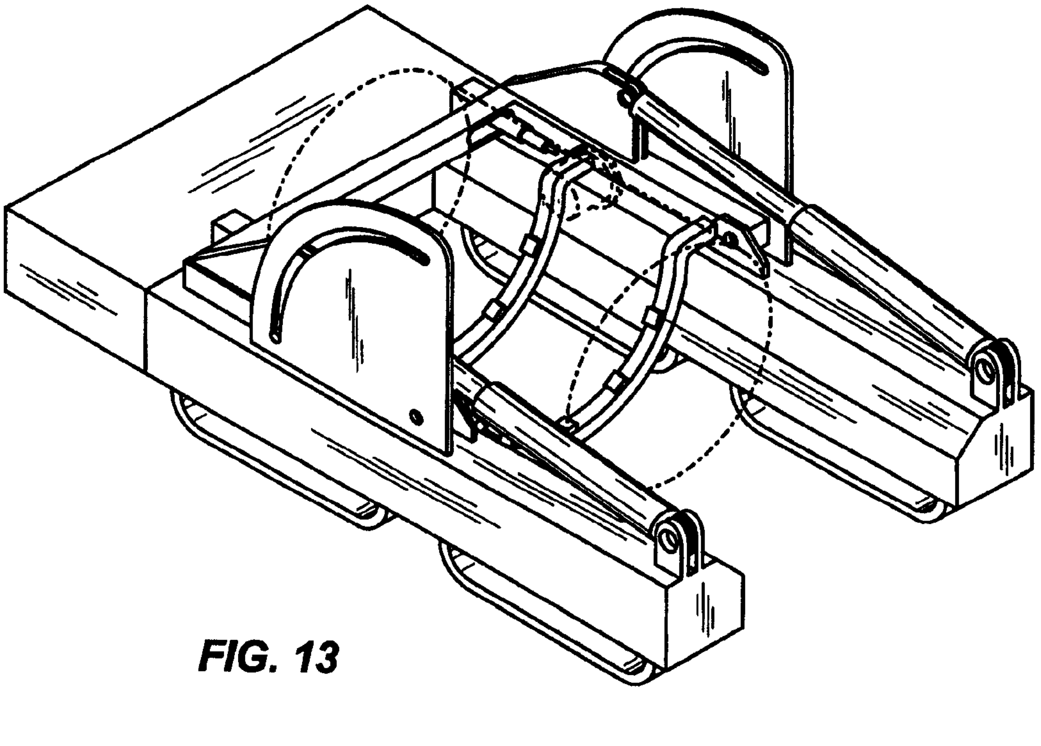
FIG. 13 is a perspective view of the device of FIG. 12 with the cask shown in ghost and in a horizontal position.

In the preferred embodiment, as shown in FIGS. 1 to 10, the container moving means includes a first moving means 46 and a second moving means 50. The first moving means 46 moves the container 14 and cradle 22 relative to at least part of the base frame assembly 18 and the second moving means 50 moves the container 14 relative to the cradle 22 and generally parallel to the cradle center line 38. In other embodiments, only one or the other of the first and second moving means may be used. One example of such embodiment is shown in FIGS. 12 and 13 and described in greater length below.

More particularly, the base frame assembly 18 further includes an upper base frame 54 supported above a base frame 56 by the first moving means 46. Still more particularly, the base frame 56 is box shaped, and the upper base frame 54 is boxed shaped with an open bottom and is size to fit over the top of the base frame 56. The first moving means 46 is in the form of means for raising and lowering the upper base frame 54 relative to the base frame 56. The means 58 for raising and lowering the upper base frame 54 relative to the base frame 56 includes at least two extendable and retractable base frame hydraulic cylinders 62 extending between the upper base frame 54 and the base frame 56.

More particularly, the base frame hydraulic cylinders 62 are received in respective bores (not shown) in the base frame 56 and are attached to the upper base frame 54. All hydraulic cylinders in the device of this invention are part of a conventional hydraulic circuit (not shown) including controls (not shown) for raising and lowering the hydraulic cylinders. The hydraulic and electric controls (not shown) are preferably operated remotely from the device 10, but the controls can also be on the device.

Further, as best seen in FIG. 2, the means 58 for raising and lowering the upper base frame 54 relative to the base frame 56 further includes a spaced apart pair of vertical guides 74 on each exterior side of the base frame 18 mates with a spaced apart pair of vertical guide lots 78, each on the interior side of the upper base frame 54. The guides 74 assist in maintaining alignment of the upper base frame 54 with the base frame 56. In other embodiments (not shown), other first moving means can be used, such as vertical extendable hydraulic cylinder connected on each side of the device directly between the base frame and the cradle.

Figure 9:
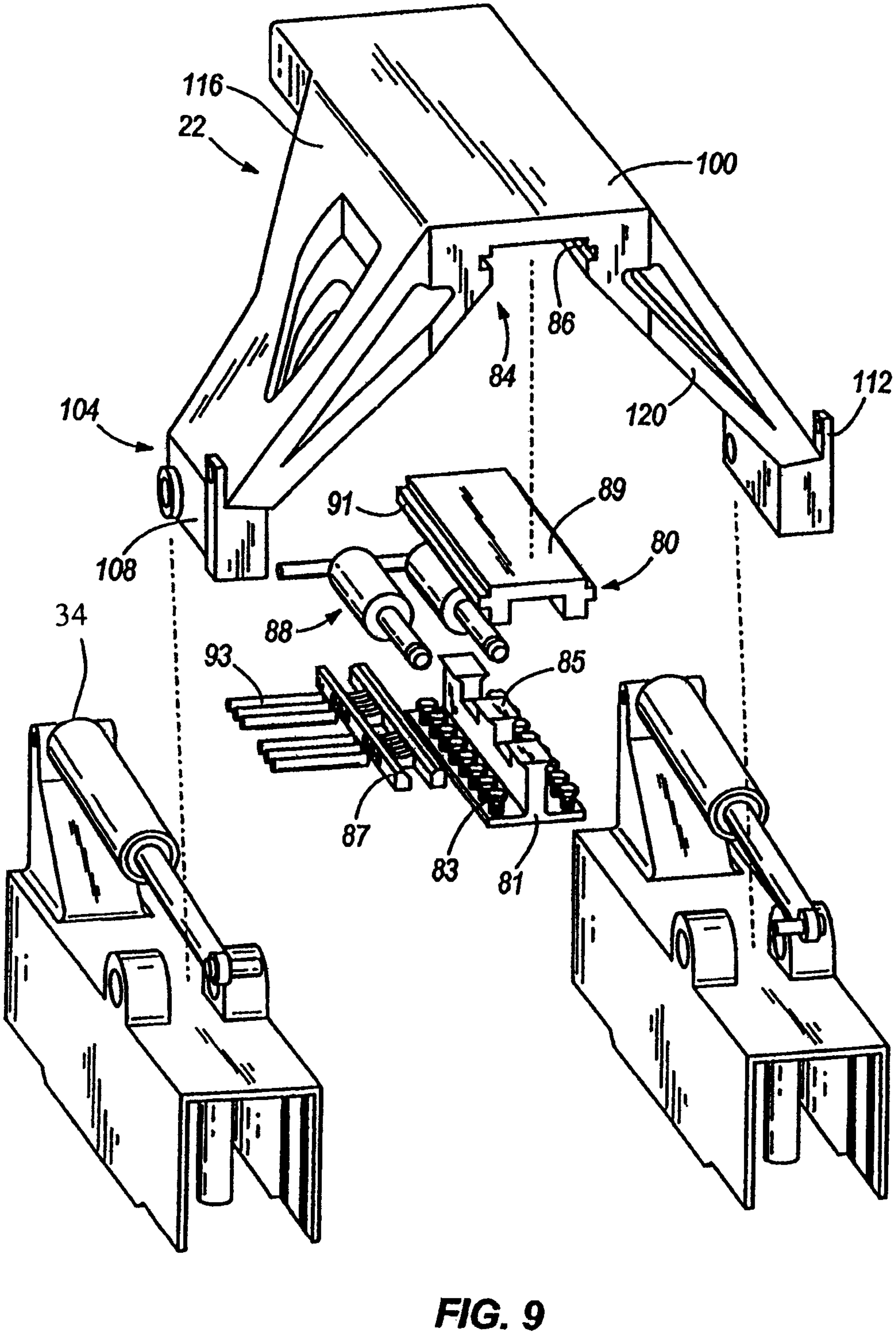
FIG. 9 is a perspective partially exploded top view of the device of FIG. 1 without the cask and without a base frame assembly.
Figure 10:
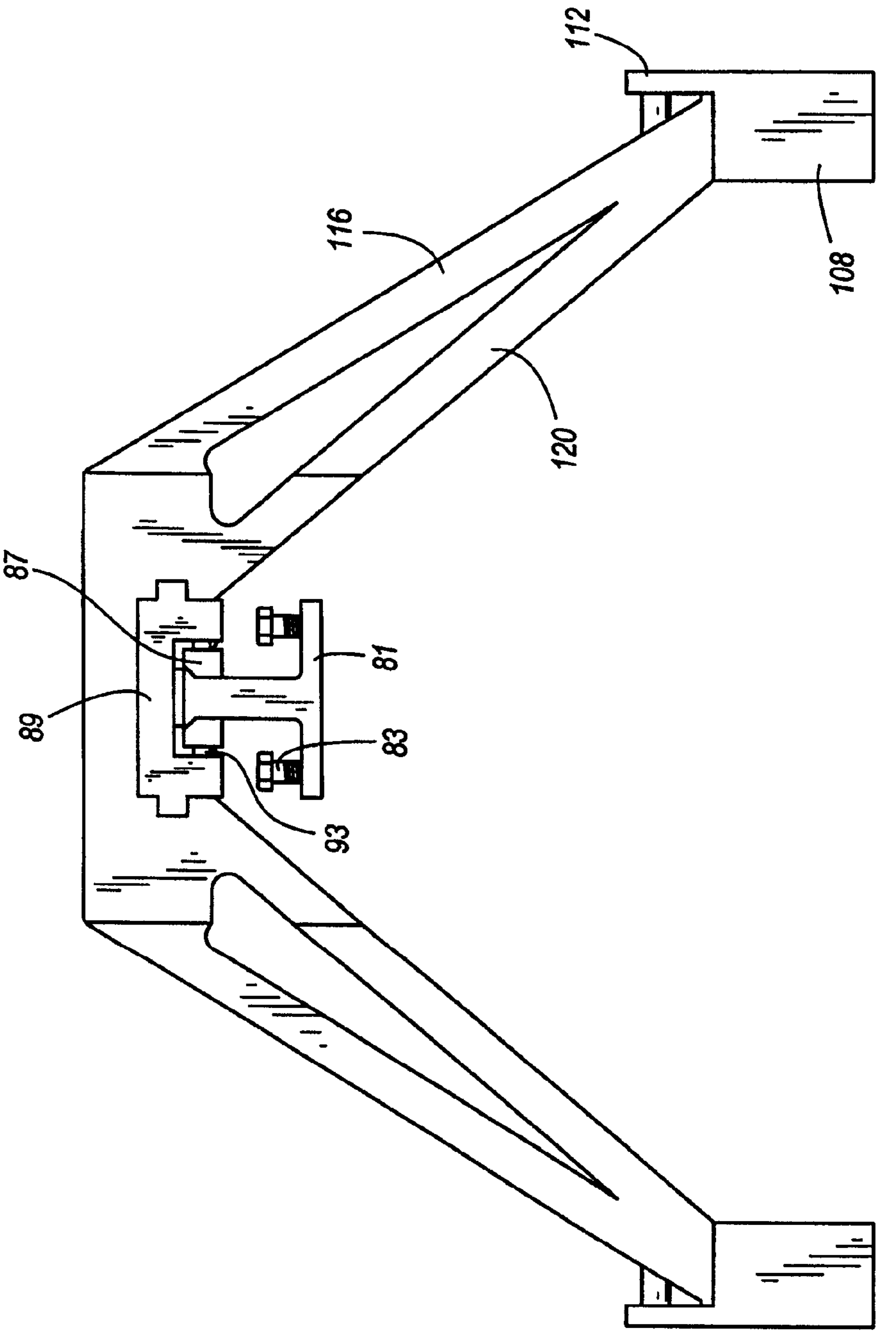
FIG. 10 is an assembled side view of the part of the device shown in FIG. 9.

As best seen in FIGS. 2, 9 and 10, the second moving means 50 comprises an adapter 80 adapted to be attached to the container 14, means 84 for attaching the adapter 80 to the cradle 22, and means 88 for moving the adapter relative to the cradle 22. The attaching means 84 comprises the cradle 22 further including an adapter-receiving slot 86 generally parallel to the cradle centerline 38, the adapter 80 being slidably held in the slot 86, and the means for moving the adapter 80 in the form of a cradle hydraulic cylinder assembly 88 extending between the adapter 80 and the cradle 22 within one end of the slot 86 (see FIG. 2). In other embodiments (not shown) means such as an electric motor and a conventional screw drive can be used to move the adapter 80 relative to the cradle 22.

In an alternative embodiment, as shown in FIGS. 12 and 13, the attaching means 84 comprises a hoist 96 attached to and extending between the cradle 22 and the container 14, as further explained below.

More particularly as shown in FIGS. 9 and 10, the adapter 80 comprises an assembly of an adapter plate 81 that is secured to the cask 14 by a plurality of spaced-apart threaded fasteners 83 extending through holes in the adapter plate 81 that are received in mating threaded holes 9not shown) in the cask 14. The adapter plate further has 3 spaced-apart T-shaped support posts 85. The top of each of the T shapes has a curved lower surface that sits in a curved indentation in an adapter plate bed 87 that receives the support posts 85. The adapter bed 87 is received in a table shaped adapter carriage 89 that has outwardly extending flanges 91 that are received in the slot 86. The assembly of the plate 81, bed 97 and carriage 89 are held together by a plurality of spaced-apart pins 93 that pass through holes in the carriage 89 and bed 87. The bed 87 can slide on the pins relative to the carriage 89.

In order to aid in the adapter plate 81 being secured to the cask 14 by the plurality of spaced-apart threaded fasteners 83, six degrees of freedom movement are permitted between the adapter plate 81 and the cask 14. More particularly, two of the six degrees are provided by the up and down movement of the lifting means 58, the side to side movement of the adapter plate 81 and bed 87 relative to the adapter carriage 89 permitted by the bed 87 sliding on the pins 93. An additional two of the six degrees are provided by the front to back movement, by the means 88, of the adapter 80 relative to the backbone 100, and the tilt movement of the adapter 88 by the cradle rotation means 34. The last two of the six degrees are provided by the rocking movement of the top of the adapter plate posts 85 relative to the adapter bed 87, and axial misalignment of the threaded fasteners relative to the ground by providing some freedom of movement of the fasteners 83 relative to the adapter plate holes that receive the fasteners 83.

Alignment and fastening of the adapter 80 to the cask 14 can be done manually with visual inspection, or can be automated (not shown) by with the use of position sensors and fastener rotating means.

Figure 6:
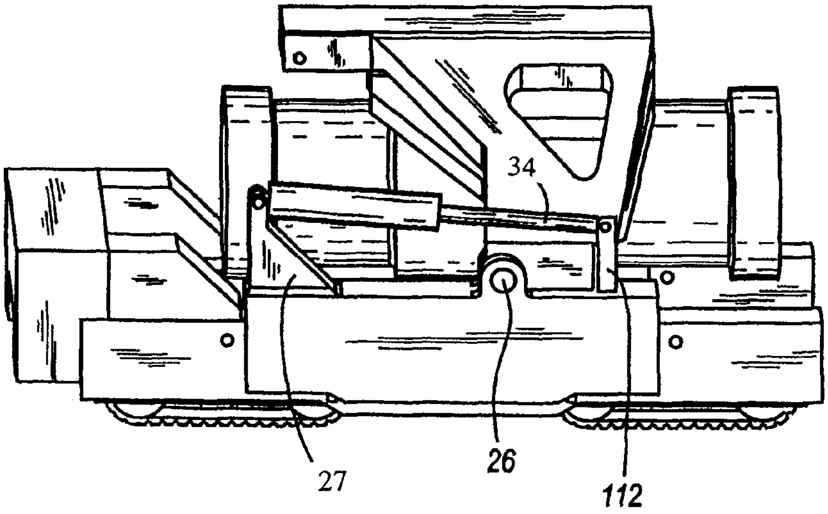
FIG. 6 is a side view of the device of FIG. 5, without the railroad platform, with the cask moved to the left so the cask may be pivoted counterclockwise.
Figure 7:
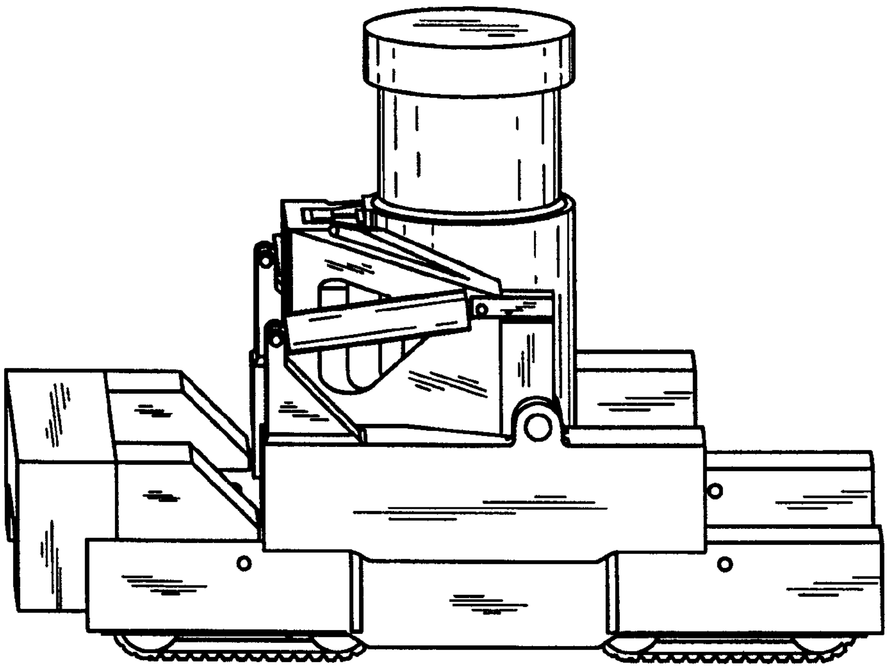
FIG. 7 is a side view of the device of FIG. 1 with the cask pivoted to an upright vertical position.
Figure 8:
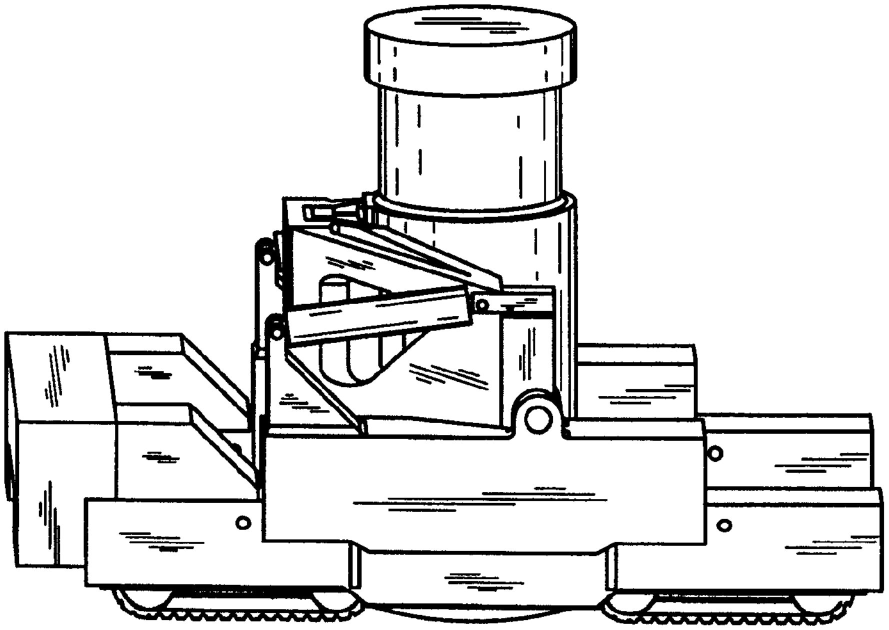
FIG. 8 is a side view of the device of FIG. 7 with the cask lowered to where the cask sits on the ground.

As best shown in FIGS. 3, 4, 7 and 9, the means 26 for connecting the cradle 22 to the base frame assembly 18 is in the form of a conventional pivoting connection, and the means 34 for rotating the cradle 22 relative to the base frame assembly 18 is in the form of a pair of hydraulic cylinders. Each cylinder is pivotally attached to and extends between a side of the base frame 18 and a side of the cradle 22 and over the cradle pivot connection 26. By placing each of the hydraulic cylinders over its respective cradle pivot connection 26, the weight of the cask can be used to aid in rotating the cask 14. More particularly, if the center of gravity of the cask is to the left of the pivot point, as shown in FIG. 6, then the weight of the cask aids in rotating the cask 14 to a vertical position.

More particularly, one of the cylinder end of the cylinders is pivotally connected to the top of a triangular shaped post 27 (see FIG. 4) on the top of the upper base frame 54, and the rod end of the cylinder is pivotally connected to the cradle at extension 112, as more particularly described below. In other less preferred embodiments (not shown), means such as an electric motor and a gear assembly can be used to rotate the cradle, pivotally connected to the base frame assembly, relative to the base frame assembly.

In the preferred embodiment, as shown in FIGS. 9 and 10, the cradle 22 includes a backbone 100 and a support frame 104. The adapter 80 is slidably received in the cradle backbone 100, and the support frame 104 extends between the backbone 100 and the base frame assembly 19. More particularly, the support frame 104 includes a spaced apart pair of support legs 108 pivotally attached at one end to the base frame assembly 18, an extension 112 near the end of each support leg 108 that is pivotally attached to the cradle rotating cylinders 34, and a pair of the first posts 116 that extend from each leg 108 to a side of the cradle backbone 100. The support legs 108 also include a pair of second posts 120 extends from the inside of each of the legs 108.

The base frame assembly 18 is substantially C-shaped, with an end tie 144 that connects the two base frames 56. This shape of the platform 14 allows the cask transporter system 10 to be driven over and around the cask 30 for engagement therewith. In this embodiment the end tie is solid, but in other embodiments (not shown) the end tie can be telescope like in construction so that it can be collapsed if desired to reduce the overall width of the device for transportation and storage. In other embodiments, such as that shown in FIG. 11, the end tie can be omitted entirely.

In an alternative but less preferred embodiment, as shown in FIGS. 12 and 13, a cradle 146 is formed from two spaced apart curved segments 148 that extend between cradle legs 152. A top beam 156 extends between the cradle legs 152, and the hoist 96 is in the form of two hydraulic cylinders that extend between near each end of the top beam 156 and a pair of posts 160, each of which extend from a side of the container 164. The cylinders are received in slots 162 and can be moved within the slots 162 to properly position the container 164. Slotted guide plates 168 on each side of the base frames 178 receive a guide pin 170 on the cradle legs 152 and aid in the maintaining alignment of the cradle legs 152 when the hydraulic cylinders 172 rotate the cradle 146. In this embodiment, the container 164 lies in the cradle 146 when the cradle 146 is rotated, as shown in FIG. 12. other parts of the device are essentially the same as in the earlier embodiments and are not described again.

In operation, as shown in FIGS. 4 through 8, the deices perform a method of moving a massive container, the method comprising the steps of connecting the cradle to the container, then lifting the container vertically, and pivoting the cradle to rotate about ninety degrees the container in a vertical plane.

More particularly, the device performs a method of lifting and rotating a massive container comprising the steps of attaching means to the container for vertically moving and cradling the container, and then rotating about ninety degrees the container in a vertical plane.

Figure 5:
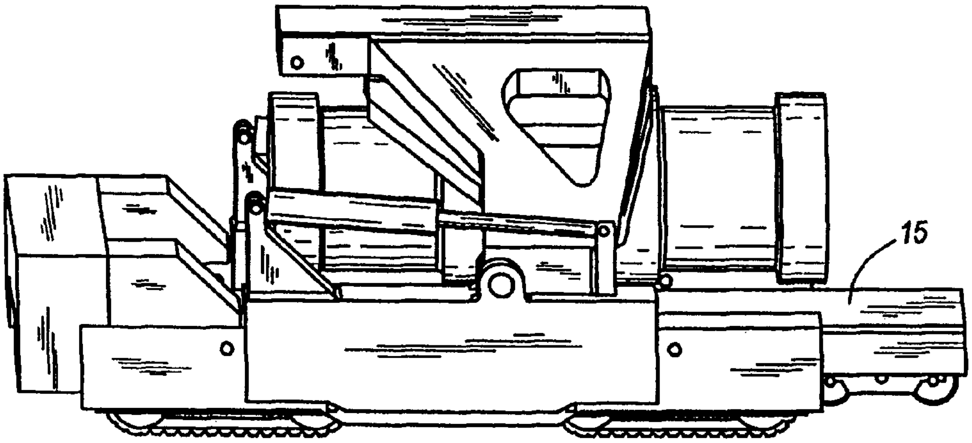
FIG. 5 is a side view of the device of FIG. 4 with the cask in a raised position.

The method further includes the step of vertically moving the container before rotating the container, as shown in FIGS. 1 and 5. The method further includes the steps of vertically raising the container while rotating the container, as shown in sequence from FIGS. 6 to 7, and then vertically lowering the container to the ground, as shown in sequence from FIGS. 7 to 8. The container can also be picked up and placed on a rail car by reversing the above steps.

While various materials can be used for all of the components referred to herein, preferably steel or some other strong and durable materials are used.

Various features of the invention are set forth in the following claims.

What is claimed is:

1. A method for moving a nuclear fuel rod storage cask having a longitudinal axis comprising the steps of:

positioning a self-propelled vehicle adjacent the storage cask while the storage cask is in a first storage position where the longitudinal axis of the storage cask is in a horizontal orientation, wherein the vehicle has a base frame with a cradle rotatably secured to the base frame and the vehicle is positioned adjacent the storage cask with the base frame straddling the storage cask so that the base frame is located at opposite lateral sides of the storage cask and the cradle extending over the storage cask between the base frame at the opposite sides of the storage cask, wherein an adapter is secured to the cradle for movement therewith and is selectively movable relative to the cradle in a direction of a longitudinal axis of the cradle, and wherein the vehicle is positioned adjacent the storage cask with the adapter located directly above the storage cask;

positioning the adapter relative to the storage cask so that a plurality of spaced-apart threaded fasteners can extend from the adapter to the storage cask to secure the adapter to the storage cask, wherein there are six degrees of freedom of movement between the adapter and the storage cask;

connecting the adapter of the cradle to the storage cask with the plurality of spaced-apart threaded fasteners extending from the adapter to the storage cask and the longitudinal axis of the storage cask parallel with the longitudinal axis of the cradle while the storage cask is in the first storage position;

lifting the cradle and the storage cask connected thereto to lift the entire storage cask vertically from the first storage position;

pivoting the cradle with the storage cask connected thereto about a horizontal axis perpendicular to the longitudinal axis of the cradle to rotate the longitudinal axis of the storage cask about ninety degrees to a vertical orientation;

after pivoting the cradle, lowering the rotated cradle and the storage cask secured thereto to lower the entire storage cask vertically to a second storage position where the longitudinal axis of the storage cask is in the vertical orientation; and disconnecting the storage cask from the adapter of the cradle by removing the threaded fasteners from the storage cask while the storage cask is in the second storage position.

2. The method according to claim 1, wherein the step of vertically lifting the storage cask is performed before rotating the storage cask.

3. The method according to claim 1, wherein the step of vertically lifting the storage cask is performed while rotating the storage cask.

4. The method according to claim 1, further comprising the step of horizontally moving the adapter and the entire storage cask connected thereto relative to the cradle while the storage cask is in the horizontal orientation.

5. The method according to claim 1, wherein the step of vertically lifting the entire storage cask includes the step of actuating at least one hydraulic cylinder.

6. The method according to claim 1, wherein the step of rotating the storage cask includes the step of actuating at least one hydraulic cylinder.

7. The method according to claim 1, further comprising the step of positioning the cradle over the storage cask while the storage cask is in the first storage position and on a rail car.

8. The method according to claim 7, wherein the step of positioning the cradle over the storage cask includes the step of positioning the base frame supporting the cradle to straddle the rail car.

9. The method according to claim 1, further comprising the step of longitudinally moving the adapter and the entire storage cask connected thereto relative to the cradle in a direction of the longitudinal axis of the storage cask.

10. The method according to claim 9, wherein the step of longitudinally moving the adapter and the entire storage cask connected thereto relative to the cradle includes the step of actuating at least one hydraulic cylinder.

11. The method according to claim 1, wherein the vehicle is remotely controlled.

12. The method according to claim 1, wherein the vehicle is propelled by a plurality of tread mechanisms.

13. A method for lifting and rotating a nuclear fuel rod storage cask having a longitudinal axis comprising the steps of:

positioning a base frame and the storage cask adjacent one another while the storage cask is in a first storage position, wherein the base frame has a cradle rotatably secured to the base frame and the base frame straddling the storage cask so that the base frame is located at opposite lateral sides of the storage cask and the cradle extending over the storage cask between the base frame at the opposite sides of the storage cask, wherein an adapter is secured to the cradle for movement therewith and is selectively movable relative to the cradle in a direction of a longitudinal axis of the cradle, and wherein the adapter is located directly above the storage cask;

positioning the adapter relative to the storage cask so that a plurality of spaced-apart threaded fasteners can extend from the adapter to the storage cask to secure the adapter to the storage cask, wherein there are six degrees of freedom of movement between the adapter and the storage cask;

attaching the adapter of the cradle to the storage cask with the plurality of spaced-apart threaded fasteners extending from the adapter to the storage cask and the longitudinal axis of the storage cask parallel with the longitudinal axis of the cradle while the storage cask is in the first storage position;

lifting the cradle and the storage cask attached thereto to lift the entire storage cask vertically from the first storage position;

rotating the cradle and the storage cask attached thereto about a horizontal axis perpendicular to the longitudinal axis of the cradle to rotate the longitudinal axis of the storage cask about ninety degrees;

longitudinally moving the adapter and the entire storage cask attached thereto relative to the cradle in a direction of the longitudinal axis of the storage cask;

after rotating the cradle, lowering the rotated cradle and the storage cask attached thereto to lower the entire storage cask vertically to a second storage position; and detaching the storage cask from the adapter of the cradle by removing the threaded fasteners from the storage cask while the storage cask is in the second storage position.

14. The method according to claim 13, wherein the step of vertically lifting the storage cask is performed before rotating the storage cask.

15. The method according to claim 13, wherein the step of vertically lifting the entire storage cask is performed while rotating the storage cask.

16. The method according to claim 13, wherein the step of longitudinally moving the storage cask includes horizontally moving the storage cask.

17. The method according to claim 13, wherein the step of vertically lifting the entire storage cask includes the step of actuating at least one hydraulic cylinder.

18. The method according to claim 13, wherein the step of rotating the storage cask includes the step of actuating at least one hydraulic cylinder.

19. The method according to claim 13, further comprising the step of positioning the cradle over the storage cask while the storage cask is in the first storage position and on a rail car.

20. The method according to claim 19, wherein the step of positioning the cradle over the storage cask includes the step of positioning the base frame supporting the cradle to straddle the rail car.

21. The method according to claim 13, wherein the step of longitudinally moving the adapter with the entire storage cask attached thereto relative to the cradle includes the step of actuating at least one hydraulic cylinder.

22. The method according to claim 13, wherein the base frame is carried by a self-propelled vehicle.

23. The method according to claim 22, wherein the vehicle is remotely controlled.

24. The method according to claim 22, wherein the vehicle is propelled by a plurality of tread mechanisms.

* * * * *